W. R. HOPSON.
VEHICLE WHEEL.
APPLICATION FILED JULY 28, 1914.
1,146,796.
Patented July 20, 1915.
2 SHEETS—SHEET 1.
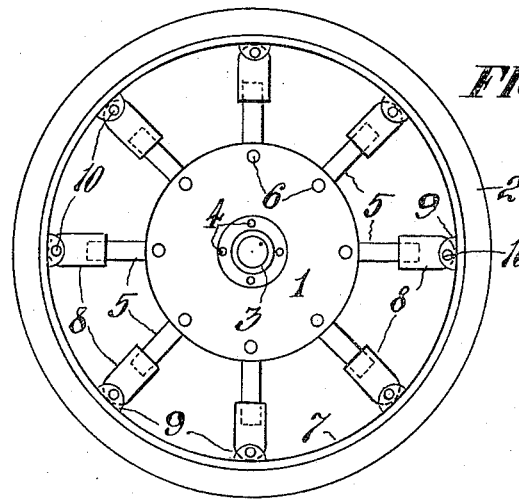
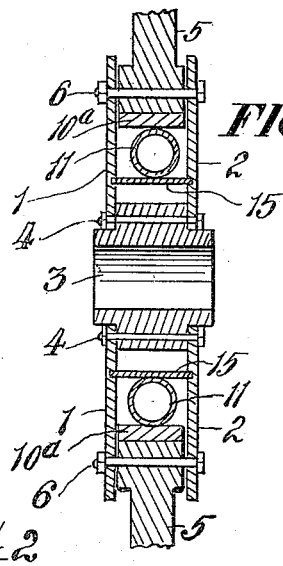
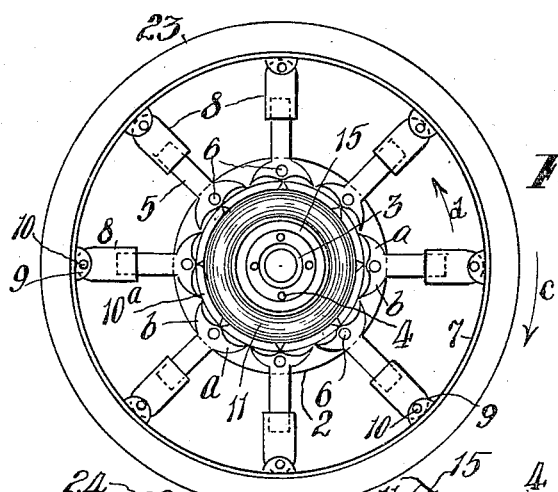
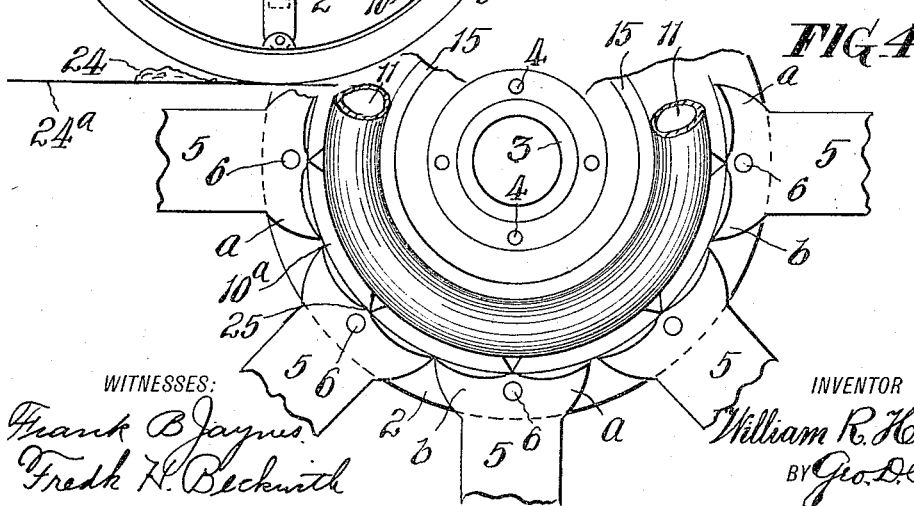
WITNESSES:
Frank B. Jaynes
Fredk H. Beckwith
INVENTOR
William R. Hopson,
BY Geo. D. Phillips
his ATTORNEY

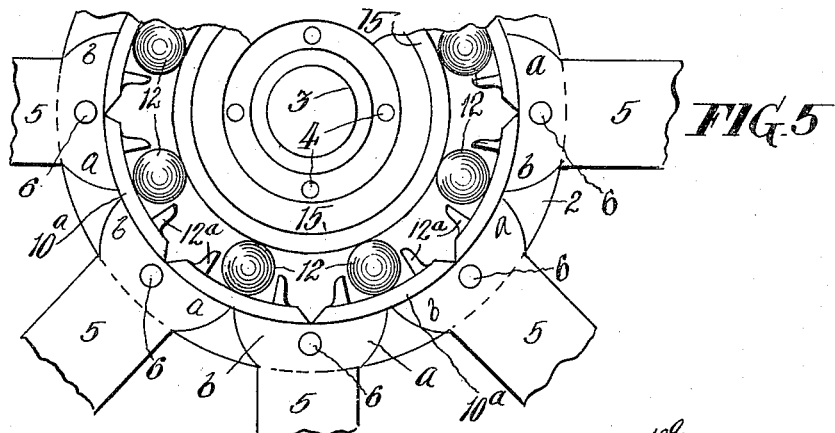

UNITED STATES PATENT OFFICE.

WILLIAM R. HOPSON, OF BRIDGEPORT, CONNECTICUT.

VEHICLE-WHEEL.

1,146,796.     Specification of Letters Patent.     Patented July 20, 1915.

Application filed July 28, 1914. Serial No. 853,592.

*To all whom it may concern:*

Be it known that I, WILLIAM R. HOPSON, citizen of the United States, residing at Bridgeport, in the county of Fairfield and State of Connecticut, have invented certain new and useful Improvements in Vehicle-Wheels; and I do hereby declare the following to be a full, clear, and exact description of the invention, such as will enable others skilled in the art to which it appertains to make and use the same.

My invention relates to vehicle wheels and particularly to the hub portion of the wheel occupying a floating position with respect to the rim.

Referring to the drawings: Figure 1 represents a wheel equipped with my improved floating hub; Fig. 2 is a similar view showing one of the plates of the hub removed; Fig. 3 is an enlarged broken central sectional view of the wheel shown in Figs. 1 and 2; Fig. 4 is an enlarged broken view of the interior hub construction shown in the preceding figures equipped with an inflated tube; Fig. 5 is an enlarged broken view of the interior of the hub showing rubber balls as an internal resilient member; Fig. 6 is an enlarged broken view of the hub showing a sectional view of a solid rubber ring as an internal resilient member; Figs. 7 and 8 show springs employed as a resilient member.

The object of my invention is to locate the resiliency of the wheel at the center rather than at the periphery as in the case of the usual pneumatic tire construction. The side plates 1 and 2 are secured to the hub 3 by bolts 4 and to the spokes 5 by bolts 6. The spokes are adapted to rock on the bolts 6 and have a free movement between the side plates. Any well known means may be employed for pivotally attaching the outer ends of the spokes to the rim 7. In Figs. 1 and 2 I show the sleeves 8 devoid of springs and pivoted to the ears 9 of the rim by pins 10. The outer projecting ends of the spokes have a slight but free radial movement in said sleeves.

Each spoke is provided with lateral arms $a$ and $b$ adapted to engage the floating plates $10^a$ circumferentially arranged between the arms and any suitable resilient material. In Figs. 1, 2, 3 and 4, this material consists of the inflated tube 11. In Fig. 5 the series of rubber balls 12 are employed, and these may be held in place by means of the lugs $12^a$ projecting from the plates $10^a$, or other like effective means could be used. In Fig. 6 the rubber ring 13 is shown having the projections 14 on which the plates $10^a$ are adapted to rest. All resilient material rests on the ring 15, or other like fixed support secured to the side plates in any convenient manner.

In Fig. 7 the resilient support for the movable plates $10^a$ consists of the springs $15^a$ located between these plates and the heads 16 of the threaded bolts 17 engaging threaded holes in the lugs 18 projecting from the side plates. By means of this threaded connection of the bolts and lugs, the tension of the springs is increased or decreased. In Fig. 8 the springs 19 are located on the outside of the plates, but in this instance the bolts 20 pass freely through lugs 21 and their threaded ends engage the threaded nuts 22. The tension of these springs is regulated by simply turning the bolts. In both instances the bolts pass freely through the plates $10^a$ and the fixed ring 15 shown in the other views is dispensed with.

The tread 23 of the wheel may be of any suitable material and need not be resilient, as all the resiliency required is located at the hub portion of the wheel.

It is very evident from the construction of the wheel that if an effective initial tension is given to the resilient elements, the normal position of the floating hub will be in the center of the wheel. No spoke could then turn upon its pivotal connection with the floating hub without overcoming the initial and increasing resistance of the resilient elements to centripetal movements of the compression plates $10^a$ in close contact with said resilient elements. The arms $a$—$b$ being rigid or integral with the spokes will oscillate therewith and give a thrust movement to said plates, or, in some instances, they would directly engage the resilient elements without the intervention of said plates. While well defined arms are shown projecting from the inner ends of the spokes, it is quite evident that these ends could be made wide enough to perform the same function and give the same result.

In the transmission of rotary motion from the floating hub to the rim, it will be readily seen that one arm of each spoke would engage one of the series of plates $10^a$ and thus the entire series of plates would be engaged simultaneously. It will also be readily seen that a certain per cent. of the surplus power necessary to sustain the load would always be available for shock absorption; thus, for example, when the wheel, rotating in the direction of arrow c, Fig. 2, meets the obstruction 24 on the road bed 24ᵃ; the hub would be depressed, and the vertical spokes would simply slide in their sleeves, and all others would be deflected more or less; for instance the sleeves 8 and the upper ends of the spokes at the right of the vertical spokes deflected to the left, and those to the left deflected to the right. The maximum flexure would be of the horizontal spokes and the maximum resilient resistance would be nearly on a line with the pivots of the two most nearly horizontal spokes.

It is evident, as shown by the illustrations, that in a floating hub, such as I have designed, many forms of resilient elements may be utilized, all acting upon the same basic principle, or form of construction of the actuating parts.

The central curved projections 25 at the inner ends of the spokes may be employed to prevent abnormal tilting of the plates under the rocking movement of the arms.

Having thus described my invention, what I claim is:

A resilient vehicle wheel comprising a hub, a rim, pivoted spokes and radially acting resilient element arranged concentrically about the hub, combined with floating plates concentric with said resilient element, an equal number of pivoted spokes, the inner pivoted end of each spoke having lateral extensions integral therewith and projecting each way in the plane of the wheel, each extension adapted to engage one of said plates approximately in the center thereof, and each of said plates engaging a pair of spokes, said resilient element resisting the movements of said floating plates in the direction of the center of the wheel and by this means enabling said plates to resist the oscillations of the spokes and said spokes to transmit rotary motion.

In testimony whereof I affix my signature in presence of two witnesses.

WILLIAM R. HOPSON.

Witnesses:
GEORGE W. FINN,
DAVID FENELON.

Copies of this patent may be obtained for five cents each, by addressing the "Commissioner of Patents, Washington, D. C."